Aug. 16, 1927.
J. AVERY
1,638,977
TREATMENT OF LIQUIDS CONTAINING OIL OR FATTY SUBSTANCES AND THE LIKE
Filed Sept. 27, 1923
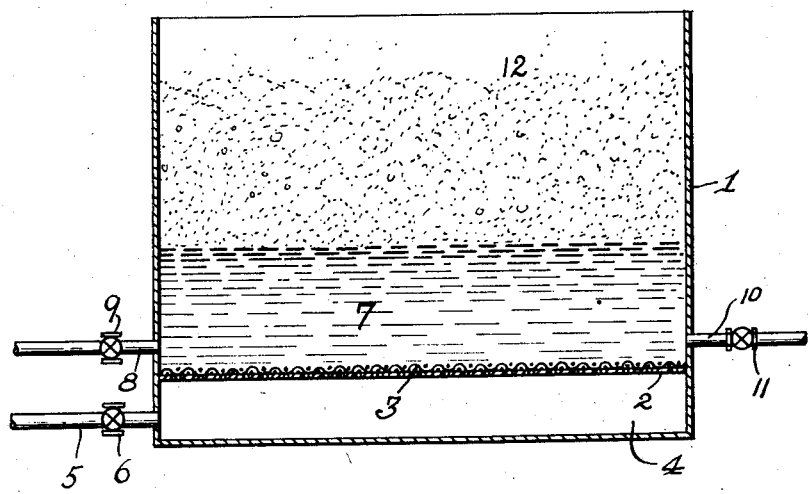
INVENTOR.
J. Avery
BY Marks & Clerk
ATTORNEYS.

Patented Aug. 16, 1927.

1,638,977

UNITED STATES PATENT OFFICE.

JOHN AVERY, OF ARMADALE, AUSTRALIA, ASSIGNOR TO AUSTRALIAN LANOLINE PROPRIETARY LIMITED, OF MELBOURNE, VICTORIA, AUSTRALIA.

TREATMENT OF LIQUIDS CONTAINING OIL OR FATTY SUBSTANCES AND THE LIKE.

Application filed September 27, 1923, Serial No. 665,241, and in Australia October 23, 1922.

This invention relates to improvements in the treatment of liquids containing oily, waxy, or fatty substances and the like in the form of emulsion, as, for example, the treatment of liquor resulting from the scouring or washing of wool.

Though this invention is herein described is applied to the treatment of liquids such as wool scouring liquors containing lanoline it will be understood that it is equally applicable to the treatment of liquids containing other oily, fatty, waxy, or such like substances as an emulsion, and that hereafter in this specification the term "fatty substances" will include such other substances for the separation of which the invention is applicable.

In the treatment of wool scouring liquors and such like liquids, it has been suggested to subject them to the action of air or equivalent gas in the form of fine jets whereby the fine colloid particles are so agglomerated that they can be directly recovered without the aid of chemicals. It has also been suggested to treat such liquids by submitting them to mechanical agitation and to the action of a gas in the form of minute bubbles for the formation of a froth of the fatty substances which can be separated and removed.

These fatty substances are present in the liquids in the form of an emulsion, the liquid usually containing some emulsifying agent (such as soap or an alkali). I have found that in the operation of the abovementioned processes for the formation of a froth for separation of these fatty substances, there is a tendency during the process of separation for the said substances to be re-emulsified with the liquid. This tendency is accentuated if the separated substances are mixed with the liquid, for example, by agitation, and, as a rule, this tendency to re-emulsification is increased by raising the temperature.

Now, the object of this present invention is to provide certain improvements in the treatment of liquids (such as wool scouring liquids) containing fatty substances (such as lanoline) whereby the said fatty substances and the liquid may be economically separated from each other, so that the respective products may be in a condition suitable for subsequent commercial use.

I accomplish the abovementioned object by subjecting such liquids containing fatty substances to aeration by means of a stream of minute bubbles of air under such conditions and in such manner that a supernatant froth is formed containing the fatty substances sufficiently stable to hold and maintain the same therein for the purpose of effecting their separation from the liquid but which is also sufficiently fragile to permit its being broken down for the release of the fatty substances therefrom in a condition facilitating their removal and recovery.

I have found that the following factors or conditions inter alia, contribute to and affect the formation of a satisfactory froth, that is, a froth sufficiently stable on the one hand and sufficiently fragile on the other, for the purposes specified, viz:— a. The temperature of the operation, that is to say, the temperature of the liquid being treated, the temperature of the froth above the liquid, modified by the cooling effect of the means adopted for draining and washing the froth.

b. The nature of the aeration, that is to say, the manner in which the air is introduced, the amount of air introduced, the fineness of the bubbles formed, the depth of the liquid through which the bubbles rise, and the relative tranquility of the contact surfaces of the froth and the liquid.

c. The depth of the froth, and the draining and washing thereof for the removal of adhering liquid.

This invention comprises the control and regulation of any or all of the above factors or conditions whereby a froth carrying the fatty substances is formed of the character indicated and a separation effected of the said froth from the liquid, such separated froth containing the fatty substances.

I have found that the temperature at which the operation is conducted, that is, of the liquid and also of the froth, is an important condition affecting the formation of a froth of the character indicated. For each kind of emulsion there appears to be an optimum temperature at which the most efficient froth of the character indicated is formed and as this optimum temperature is departed from, the character of the froth becomes unsatisfactory or less efficient and the separation and removal of the fatty substances more difficult. In the case of those fatty substances solid at ordinary temperature with which I have experimented, I have found that the optimum temperature is about the melting point of the fatty substances. In the case of oils which are liquid at the ordinary temperature, separation can be effected when using cold liquors. Generally, re-emulsification with the liquor takes place more readily at higher temperatures. However, in some cases, the separation of the fatty substance from the liquor can be effected at temperatures considerably above the melting point of the fatty substance, but, in such cases, it is necessary to take special precautions to prevent the re-emulsification of the fatty substance with the liquid, such as by the use of fine sprays of cold water over the froth which serve to cool the froth and to wash adhering liquor and emulsifying agent out of the froth.

Similarly, the nature of the aeration is a condition affecting the formation of the froth and its character. It is desirable to introduce the air in such a manner that the bubbles passing through the liquid are in as fine a condition as possible, consistent with efficient working and that there is a minimum of disturbance of the contact surfaces between the liquid and the froth. I have found that the most satisfactory aeration is effected by introducing the air under pressure through a porous diaphragm or medium (such as cloth or canvas) the texture of which, and the pressure of air, are such as to cause a stream of minute bubbles to rise through the liquid. Furthermore, the depth of the liquid through which the stream of minute bubbles rise should be such as to permit of sufficient time for the bubbles to contact with the particles of fatty substance for the formation of a froth of the character indicated. With liquors comparatively poor in fatty substances, a greater depth of liquid can be used and a greater volume of air passed therethrough whilst with richer emulsions either the depth of liquid or the volume of air, or both of these factors, may be restricted. In some cases it is desirable to dilute the emulsion being treated.

In addition, the relative tranquillity of the surface of the liquid affects the successful working of the process. Any undue disturbance of the contact surfaces of the liquid and the froth has a tendency to re-emulsify the separated fatty substances with the liquid.

The supernatant froth should be maintained at such a depth as to allow any liquid (and emulsifying agents, such as soap) adhering to the fatty substances in the froth to drain back into the main body of the liquid.

This removal of the adhering liquid from the froth is enhanced by spraying the froth with fine sprays of water—preferably cold. These sprays of water wash out the adhering liquid and also—when cold—cool and stabilize the froth.

If the temperature of the liquid being treated be somewhat too high for efficient working under ordinary conditions, the same may be modified by cooling down the froth by such sprays of cold water, rendering the operation flexible for control by the operator.

For the purpose of more particularly ascertaining this invention, I will now proceed to describe the treatment of wool scouring liquors, for the separation and recovery of lanoline therefrom, but as already stated, the invention is not to be taken as confined to such liquids as with suitable modification of the above factors it can be used for the separation and recovery of other fatty substances from emulsions containing them.

In the accompanying drawing, I have illustrated a suitable apparatus for use in carrying out my process. In the drawing, 1 represents a container having a perforated supporting plate 2 on which there is disposed a sheet of canvas or the like 3. The supporting plate 2 forms a false bottom 4. Air is admitted into the chamber 1 beneath the plate 2 through pipe 5 controlled by valve 6. Material to be treated, shown at 7, enters the container 1 through pipe 8 provided with valve 9 and leaves through pipe 10 provided with valve 11. Float feed means (not shown) are used to keep the depth of liquid 7 constant. The introduced air entering the false bottom 4 by pipe 5 bubbles up through the liquid 7 in fine streams to form a froth 12 rising above the liquid 7 as shown. The container 1 may be provided at its upper edges with spray pipes for spraying water onto the froth as described. The type of apparatus shown in the drawing is merely one form which is suitable. The process is not dependent upon any specific construction of apparatus.

An ordinary wool scouring liquor made up with soap and soda ash, and used for scouring wool, was cooled to a temperature ranging from about 90° F. to about 100° F. At temperatures substantially above or below this range the froth has a tendency to depart from the character indicated being either too persistent, making it difficult to recover the lanoline, or too fragile, breaking down too readily, and permitting the lanoline to re-emulsify with the liquor. At about the most efficient temperature the froth is sufficiently stable to hold and maintain the lanoline and yet is not too persistent. It becomes opaque in appearance, especially when sprayed with cold water—flecks of lanoline appear on the surface of the residual bubbles, and the froth assumes a more spongy texture, and a more stable condition.

This wool scouring liquor after being cooled to the required temperature was introduced into a box or container such as that shown in the drawing and hereinbefore described or series of boxes, where it was subjected to aeration, the liquor flowing continuously through the said box or boxes, being maintained at a constant level by a float-controlled valve. The air was introduced under pressure through a medium of cloth or canvas, as to cause a mass of minute bubbles to rise through the liquid. These minute bubbles rising to the surface formed a froth in which the lanoline accumulated.

The depth of the liquor was maintained in the boxes at about one foot, and a froth formed of a depth of about two feet, when an effective separation was obtained. The froth was continually sprayed with fine sprays of cold water which cooled and stabilized the separated lanoline in the froth which was then removed.

These sprays can be used to modify the character of the froth so that it tends to assume a spongy texture and to hold the lanoline in a form less readily emulsifiable by the underlying liquor.

This denser froth may be allowed to accumulate above the liquor to any desired extent, its presence facilitating the working of the process and helping to control the character of the froth.

The froth may be removed continuously or be allowed to accumulate in the form of a thick blanket and be removed at intervals as may be more convenient.

After the removal of the froth from the boxes, it was again sprayed or washed with cold water to further break down the froth and to remove any liquor still adhering, the water and impurities being separated by decantation or otherwise, leaving the lanoline in the form of a thick creamy material. This was then heated in the usual way and the lanoline obtained in an anhydrous form.

In the treatment of wool scouring liquors for the recovery of lanoline, I have found that the scour liquor may be treated as it comes direct from the bowls by being cooled down rapidly to the required temperature, and being then passed through the frothing boxes, and that this treated liquor may be re-used for scouring fresh batches of wool. Consequently, the scour liquor may be continuously drawn from the scouring bowls and passed through aerating boxes for the formation and separation of a froth containing the lanoline and the resulting liquor, after re-heating, returned to the bowls for the scouring of further batches of wool, and I have found that this treated and returned liquor is particularly efficacious in the scouring of wool.

In this way the content of wool fat or lanoline in the scour liquor may be prevented from becoming greater than any given amount and considerable saving in scouring material (such as soap) can be effected.

I have also found that the sludge which settles from such scour liquors on standing putrifies rapidly, whereas the clearer liquor, if separated from the sludge, does not exhibit the same tendency to rapid putrefaction.

For the purpose of separating this sludge, the liquor may be passed through a settler, the clearer liquor (overflow) being returned for the scouring of fresh batches of wool, whilst the sludge (underflow) may be drawn off and discharged, a corresponding amount of water being added to the scouring bowls to maintain the required quantity of scour liquor.

By operating in this way, a more or less continuous cycle of the scour liquor may be maintained, the liquor being used first to scour wool, and then treated for the removal of lanoline, and then returned to the bowls for again scouring wool. If settling of the sludge be also included in the cycle, the accumulation of dirt in the scour liquor can be restricted and the cycle of operations maintained for a correspondingly longer period.

I have also successfully applied the process of this invention to the treatment of milk which is an emulsion of fatty substance in water for the separation of such fatty substances in the form of butter. Similarly, the invention has been applied to the treatment of an emulsion of mineral lubricating oils in water for the separation of such fatty substances.

In carrying out the process of the invention, the nature of the froth produced depends on the character of the fatty substance present, the relation of the temperatures of liquor and froth to the melting point of the fatty substance, the kind and amount of emulsifying agent present, and the nature of other impurities present. These will vary in different emulsions so that no general directions for treatment can be given, but by carrying out laboratory experiments on any given liquor, varying the temperature of the liquor, the depth of liquor and depth of froth, the amount of air introduced and the fineness of air bubbles, the most favorable conditions for treatment can be readily ascertained. In some cases it is found to be advantageous to dilute the emulsion with water, and to subject the froth to fine spraying with cold water to stabilize and control the froth formed. A small amount of experience will soon enable the best condition in each case to be ascertained by the appearance and character of the froth. In some cases it may be necessary to remove impurities before submitting the liquor to the frothing process. It may happen that owing to the peculiar character of some emulsion, it may not be suitable for treatment by this process which would also be ascertained by such laboratory tests.

I claim:

1. In the treatment of wool scouring liquors containing fatty substances (such as lanoline) subjecting the said liquors to aeration by means of a stream of minute bubbles of air, at a temperature of from about 90° F. to about 100° F. under such conditions that a sufficiently stable froth is formed and removing the froth from the liquid.

2. In the treatment of wool scouring liquors containing fatty substances (such as lanoline) subjecting the said liquors to aeration by means of a stream of minute bubbles of air, at a temperature of from about 90° F. to about 100° F. under such conditions that a sufficiently stable froth is formed, draining any adhering liquor from the froth, washing the lanoline in the froth with sprays of cold water, and removing the froth from the liquid.

3. In the treatment of wool scouring liquors containing fatty substances (such as lanoline) withdrawing a portion of such liquor from the scouring bowls, subjecting the same to aeration with minute bubbles of air, at a temperature of from about 90° F. to about 100° F. and under such conditions that a sufficiently stable froth is formed, removing the said froth from the liquor and returning the separated liquor to the bowls for scouring further amounts of wool.

4. In the treatment of wool scouring liquors containing fatty substances (such as lanoline) withdrawing a portion of such liquor from the scouring bowls, subjecting same to aeration with minute bubbles of air, at a temperature of from about 90° F. to about 100° F. and under such conditions that a sufficiently stable froth is formed, draining the adhering liquor from the froth, cooling and washing the lanoline in the froth by sprays of cold water, separating the said froth from the liquor and returning the separated liquor to the bowls for scouring further amounts of wool.

5. In the treatment of wool scouring liquors containing fatty substances (such as lanoline) withdrawing a portion of such liquors from the scouring bowls, subjecting the same to aeration with streams of minute air bubbles, at a temperature of from about 90° F. to 100° F. and under such conditions that a sufficiently stable froth is formed containing the fatty substances, draining any adhering liquor from the said froth, spraying the said froth with sprays of cold water and removing the froth from the liquid, settling the liquid for the removal of sludge, and returning the separated liquor to the bowls for scouring further amounts of wool.

JOHN AVERY.